Dec. 13, 1927.
R. T. MYERS
1,652,454
MACHINE FOR THE FILING AND SETTING OF SAWS
Filed Aug. 18, 1924    3 Sheets-Sheet 1
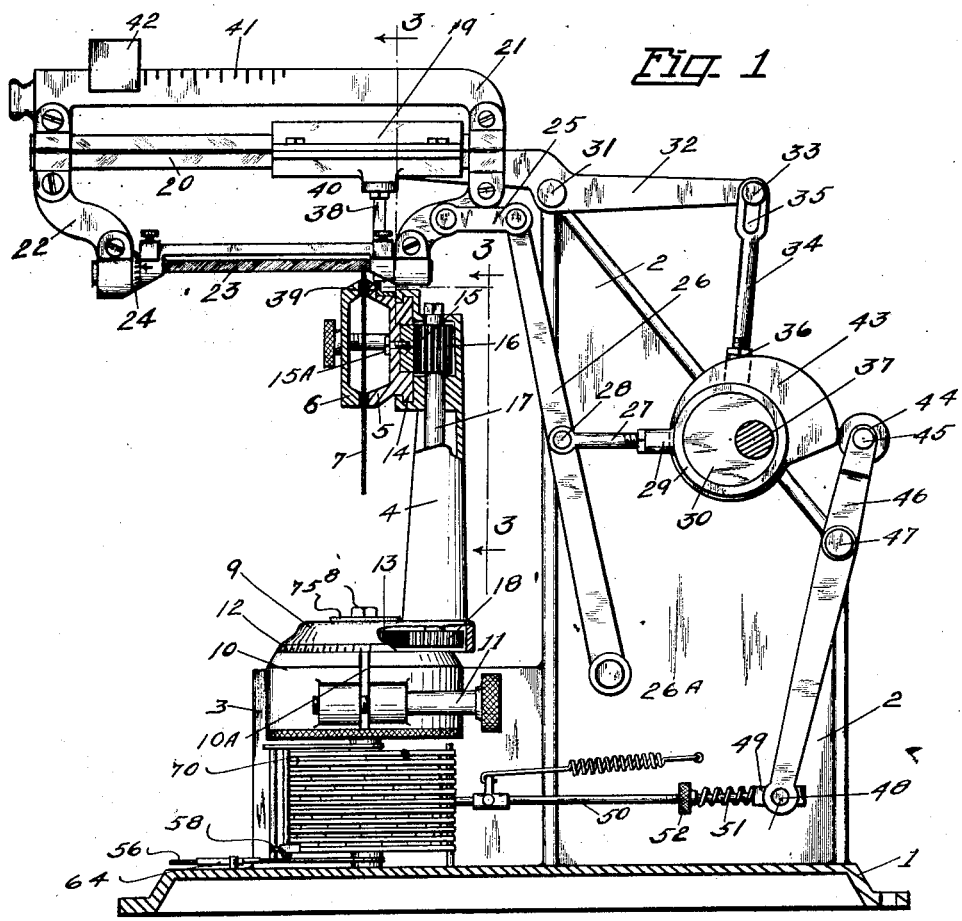
Inventor
Richard T. Myers
By Thomas Bilyeu
Attorney Dec. 13, 1927.  1,652,454
R. T. MYERS
MACHINE FOR THE FILING AND SETTING OF SAWS
Filed Aug. 18, 1924   3 Sheets-Sheet 2
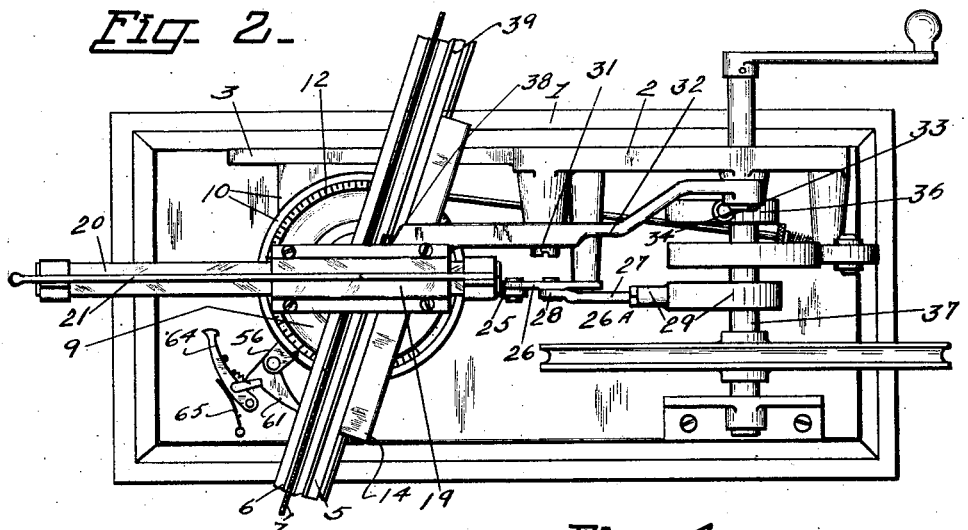
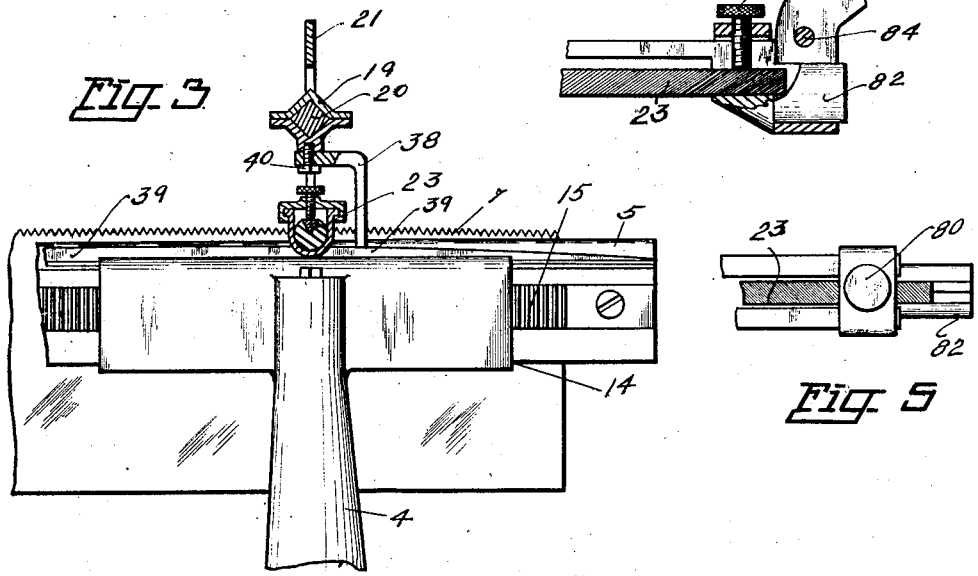
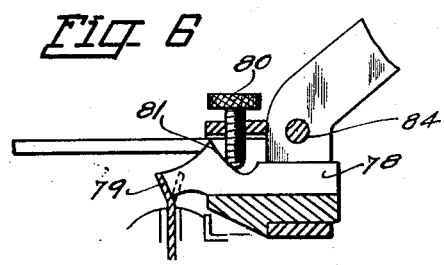
Inventor
Richard T. Myers
By Thomas Bilyeu
Attorney Dec. 13, 1927.  
R. T. MYERS  
1,652,454  
MACHINE FOR THE FILING AND SETTING OF SAWS  
Filed Aug. 18, 1924  
3 Sheets-Sheet 3
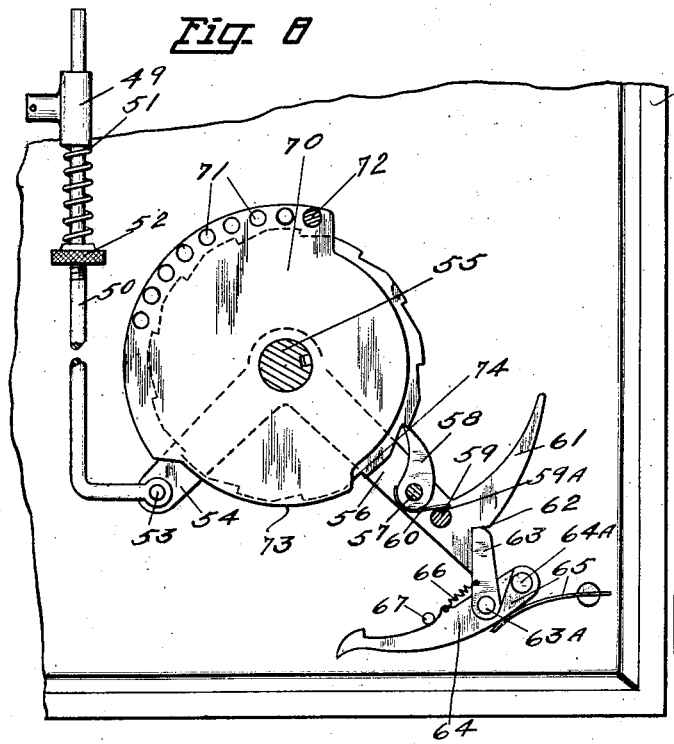
Inventor  
Richard T. Myers  
By Thomas Bilyeu  
Attorney Patented Dec. 13, 1927.

1,652,454

UNITED STATES PATENT OFFICE.

RICHARD THOMAS MYERS, OF CORVALLIS, OREGON.

MACHINE FOR THE FILING AND SETTING OF SAWS.

Application filed August 18, 1924. Serial No. 732,806.

My invention is intended for use in shops and factories and in filing rooms where saws in quantity are being filed, and consists of a base member and a frame and a saw-holding frame that is fed past the filing mechanism and file holder and set in spaced time and at required angle to the filing mechanism. Further objects of the invention make possible the filing of a saw of any number of teeth to the inch and of any degree of slope to the cutting edge. Further new and novel features of my invention are made in the arrested feed mechanism where the number of filing strokes is governed by the depth to which the file is to penetrate into the saw body, the same being governed by the amount of metal to be cut away. Additional usefulness resides in the filing and setting mechanism being operated by the same feeding and operating mechanisms.

My invention is adapted to being power-operated and to lift the file clear of the saw body during the return stroke and to feed the saw and clamp to the next space also on the return stroke of the file. Graduated means is provided to determine the angle at which the file is inclined to the vertical and also the angle to which the file is being operated in relation to the operation across the saw.

I attain these objects by the mechanism illustrated in the accompanying drawings, in which—

Fig. 1 is a section view of the machine.

Fig. 2 is a plan view of the same.

Fig. 3 is a sectional view taken on line 3—3 of Fig. 1 looking in the direction indicated.

Fig. 4 is a fragmentary side elevation of the clamping mechanism.

Fig. 5 is a plan view of the mechanism shown in the previous figure.

Fig. 6 is a fragmentary view showing the set mechanism.

Fig. 7 is a partial end, partial sectional view of the feeding mechanism.

Fig. 8 is a sectional fragmentary view of the mechanism shown in Fig. 7 taken on line 8—8 of Fig. 7 looking in the direction indicated.

Fig. 9 and Fig. 10 are diagrammatical plan views of the feeding mechanism in different positions.

Fig. 11 is a plan view of the feeding cam.

Fig. 12 is a fragmentary plan view of the clamping mechanism at the location of the saw handle.

Like reference characters refer to like parts throughout the different views.

1 is the base of the machine made of cast iron or other suitable rigid material supporting a frame member 2 to which the feeding and filing members are attached in suitable bearings. Projecting from the frame and supported upon the base is the table support 3. A column 4 is provided for supporting the clamping members 5 and 6 that are used for maintaining the saw to be filed in fixed position. The saw is shown at 7. The column 4 is supported upon a suitable table base 9 having a journal 8 passing therethrough to act as a bearing and support for the gear 13. The lower part of the column base is made cylindrical to operate within the housing 10 that serves to journal the same for proper alinement and at the same time is held in placed position by the clamping of the screw 11 tending to restrict the circumference of the same as it is split at 10$^A$. The column base is graduated as shown at 12, and being graduated in degrees enables the operator to file the saw to the desired degree; for the turning of the column carries the column and the clamp at the same time, which in turn carries the saw clamp with it and therefore the saw is turned at an angle to the file which is made to operate in a fixed path in so far as the relation to the oscillation of the feed is concerned.

The clamp side 5 operates within a suitable slide bearing upon the column 4 as shown at 14 and has attached to it the rack 15 and is held in fixed relationship therewith by suitable means which is shown as a screw 15$^A$. Meshing with the rack and being driven thereby is a pinion 16 upon the shaft 17 that is being driven by the pinion 18 attached to the lower end of the shaft 17. The shaft 17 is journaled within suitable bearings within the column to insure precise alinement. The gears 13 and 18 coact with each other, with the gear 13 being the driving member.

To provide the feeding of the clamping means a fixed amount each time to correspond to the pitch of the saw and the saw itself, requires special means for that purpose which I will now describe.

In the filing of a saw it is desirable to cut away sufficient metal only on the cutting edge of the saw tooth to sharpen the cutting edge, and to cut as little as possible from the back of the saw tooth. This condition may be changed somewhat if the rake of the tooth is to be changed, but on most filings excepting the first filing this will be true, and on the first filing this will always be true. Because of the desirability of making the main filing cut from the face, or cutting edge of the tooth, the filing pressure is in the direction of inclination of the face of the saw tooth, and because of this fact, the filing operation is not completed upon the individual tooth until a certain depth is reached. I have provided a depth stop that governs the filing depth, as well as automatic means to govern the spacing upon the release of the filing pressure. The absence of filing pressure is indicative of the completion of the filing of the individual tooth irrespective of the depth, and this is primarily true when a used saw is being filed.

To insure the full cutting capacity of the file during each stroke of the filing operation, I have provided a means for the application of additional filing pressure as the filing stroke progresses. As soon as the file has completed its cut on the forward or cutting stroke the saw will then be ready to be spaced one tooth space to begin a new filing cycle. It will thus be seen that I have provided two means for the governing of the completion of the cycle of filing, first by the depth to which the file penetrates the saw blade, the other by the absence of resistance to the application of filing pressure, but the full depth may not be attained so long as filing pressure is required, excepting when the rake is being changed, then the depth may have been attained and yet the filing may not have been completed and it is for this reason among others, that the automatic feature becomes necessary.

To insure the cutting file moving in a true path a suitable guide 19 is provided through which the slide 20 operates, a suitable back 21 is provided to afford strength and rigidity, having on its forward end a suitable holder to support the file as shown at 22, the file is shown at 23. Because of the fact that the rake of the saw tooth varies for different uses it is necessary to change the angle of the file, and to provide means for knowing in advance the angle at which the cutting edges of the file are inclined I have provided a graduated head 24 in order that the operator of the machine may set the file to the desired angle. A link 25 connects the reciprocating motion to be provided which in turn is connected to the arm 26 through suitable pin bearing connections. The arm 26 is journaled about a pin at its lower end at $26^A$, and has a pin midway its ends as shown at 28 to which the arm 27 is connected, and the arm 27 is connected by screw adjustment means to the eccentric strap 29. Rotary movement of the disk 30 imparts reciprocating motion to the connections of the eccentric strap, and in turn to the file and the file frame.

To give best results to the filing of the saw it is found desirable to lift the file clear of the saw during each return stroke of the file and frame. This is accomplished by pivoting the arm 32 about the pin 31 that is made secure within the frame member 2. The guide 19 is made fast to the arm 32. At the rear end of the arm 32 a pin 33 is provided for operating within the slot 35 of the eccentric rod 34 which is secured to the eccentric strap 36. The eccentric disk $36^A$ is secured to the shaft 37, and the object of the slot 35 is to prevent the raising of the arm 32 during the forward movement of the file, but to raise the same during the return stroke of the same.

The depth gage is one of the important features of my invention, for it performs the important function of determining the depth of the tooth, the distance the file may penetrate the saw body, as well as to compensate for the camber that is provided in some saws. The depth gage 38 contacts with the removable sloping member 39. If the plane of the teeth lies in a straight line, the member 39 will be a straight line, but if they form a curvature or lie in a camber the member 39 will be selected to correspond to the camber of the teeth.

Adjustable screw means 40 is provided at the top of the gage, for determining the depth and the same may be set to meet the requirements of each saw being filed.

It will require a different weight to be applied upon the file for a tooth of small pitch to one of a larger pitch. To provide for this I have graduated the back of the file frame 21 as shown at 41 and have provided a weight rider 42, to add the additional weight required, the same to be positioned to supply the weight to meet the requirement of the saw being filed.

To supply the filing pressure, I have provided a cam member 43 placed about shaft 37 and making one complete revolution for each revolution of the shaft, the object being to slightly crowd the saw against the file during the forward or cutting stroke of the file. An enlarged view of this cam is shown in Fig. 11. From this view it will be seen that for a part of the circumference of the cam a slight increase in diameter occurs, and for the remainder of the circumference or periphery a decrease in diameter occurs. The decrease in diameter is to provide for an absence of crowding pressure during the return stroke of the file, and the increase in diameter is to provide an increase of pressure during the forward stroke of the file. The periphery of the cam 43 contacts with the roller 44 journaled about pin 45 that operates in conjunction with lever 46. The lever 46 oscillates about a pin 47 attached to the main frame 2 of the machine. A pin 48 serves to connect the guide 49 with the lever 46 and to impart a reciprocating movement to the guide 49. Connecting rod 50 has attached thereto a thumb adjusting screw 52 against which the compression spring 51 rests upon its one end and the spring rests against the guide 49 on the other, the rod sliding in a working fit through the guide block, the pressure that is applied to this spring supplies the crowding or filing pressure that is applied to the file during the forward stroke of the file, and when a limited or no pressure is created in this spring, the absence of filing pressure is created, indicating that the tooth has been completed and the filing cycle of operation has been completed. The connecting rod is secured at its opposite end to the bell-crank 54 by means of pin 53 and imparts a reciprocating movement to the bell-crank arm. The bell-crank is secured in position by shaft 55 and the opposite arm 56 carries a pin 57 about which pawl 58 is pivoted. Stop pin 59 is also secured to the bell-crank arm 56, and spring 60, which is secured to the pawl, tends to hold the pawl in position. The bell-crank arm 56 terminates on its outer end with a wing-shaped member 61 having a depression 62, into which pawl or stop 63 engages when the arm reaches a position permitting engagement of the same therein. The pawl 63 is mounted upon the pawl arm 64 by means of the bit 63$^A$ and is pivoted about the pin 64$^A$, and the stop pin 67 serves to stop the movement of the arm and at the same time to form a post for securing one end of the spring 66 thereto to form a flexible contact for the pawl. The arm 64 is held in position against the stop by the action of the spring 65.

Mounted upon the shaft 55 are a series of ratchet disks that are attached to the shaft and when rotated impart a rotary movement to the shaft. These ratchet disks are so made to correspond to the pitch of the saw teeth, and it will be noted that in filing saws alternate teeth are filed because of the set in the teeth, and therefore each notch on the disk corresponds to the space of two teeth upon the saw. Because of the fact that the pitch of the teeth is different for different uses of the saw, I have provided a sufficient number of these disks to enable the operator to condition the widest range met with in practice. I have here shown the saw of a coarse pitch to have a corresponding disk located at the top of the bank of disks and the corresponding next lower disk located below the same, but I do not wish to be limited to the location of these disks, for the reverse order may be made to work equally well. The shaft 55 has heretofore been described as carrying the driving gear meshing with the driven gear 18 which acts to feed the saw, and the saw clamp, upon the completion of the filing of the tooth. One notch of the ratchet disk feeds the saw and saw clamp one cycle of operation corresponding to the pitch of the saw as required for alternate teeth. The pawl 58 is carried upon pin 57 and is held under pressure by spring 60 which is secured to the pawl. The spring 60 engages with stop pin 59, and since the pawl is shifted vertically about the pin 57 to permit its engagement with the various ratchet disks, the spring 60 is made to engage in notches 59$^A$ in the pin 59 that holds the pawl in locked position for engagement with the desired ratchet disk. Separating disks 70 are placed between the ratchet disks to permit the engagement of the feeding pawl 58, and it will be apparent that the movement of the ratchet disk will be governed by the engagement of the pawl with the disk and the movement of the bell-crank. Since the movement of the bell-crank is a constant, with the exception of the compression that may be absorbed by the spring 51, it becomes necessary to prevent the engagement of the pawl with the ratchet wheel. I have therefore provided the disk 70 having a series of locating holes 71 into which fits the stop pin 72, and the disk may then be positioned to the stop corresponding to the pitch upon the saw to be filed. When this has been accomplished the shield surface 73 of the disk 70 will be interposed between the pawl and the ratchet disk and the pawl will ride upon the shoulder 74 and out of engagement with the ratchet disk for a part of the stroke on the finer pitched saws, and the distance that the same rides the face 73 will depend upon the pitch of the saw, and therefore the location of the disk as determined by the hole into which the pin 72 is made to engage. Where the filing pressure, in any stroke, is too great to prevent the pawl to travel the space of one notch upon the ratchet pawl upon which it is set, the compression spring 51 is brought into action and a sufficient filing stroke operation will be brought into play until this has been relieved; at which time the arrested feed will permit a cycle of operation to be completed and the pawl will pass into the first notch and the saw and clamp will be brought into the next filing notch.

At times it may become necessary to back the saw and clamp or make the shifting of the same possible, and this is accomplished by the loosening of the locking bolt 8 which causes a friction connection between the compression collar 75 and the gear 13 being forced in tight relationship with the collar 77 upon the shaft 55.

In the setting of the saw the ratchet disk is used corresponding to the alternate tooth pitch of the saw, and the plunger 78 having the degree of set required as shown at 79 is brought into contact with the saw tooth to place the desired amount of set into the saw tooth. This is best shown in Fig. 6, and the degree of set may be arranged in advance by the locking screw 80 being applied against the slope 81 of the plunger 78.

The file is held and locked as shown in Fig. 4 wherein the locking screw 80 is brought into locking contact with the file 23. The angle at which the file may be turned from the vertical is determined by the same being held in the rotatable locking head 82, the head being held in locked position by the screw 84.

Having thus described my invention I wish to make the following claims therefor—

1. A machine for the filing and setting of saws, comprising parallel saw-holding members, a reciprocable file-holding member, and automatic means for spacing a saw positioned in said saw-holding members past the file-holding member on the completion of filing a saw tooth, said means comprising a cam, a lever oscillated by said cam, a bell-crank having a pawl mounted on one arm thereof, a connecting rod disposed between the other arm of said bell-crank and said oscillated lever, a series of ratchet disks mounted on a vertical shaft and adapted to be selectively rotated by said bell-crank and pawl, a vertical shaft and a series of gears connecting said disks with the saw-holding members and adapted to cause the same to move past the file-holding member when said ratchet disks are rotated.

2. A machine for the filing and setting of saws, comprising parallel saw-holding members, a reciprocable file-holding member, automatic means for spacing a saw positioned in said saw-holding members past the file-holding member, said means comprising a cam, a lever oscillated by said cam, a bell-crank having a pawl mounted on one arm thereof, a connecting rod disposed between the other arm of said bell-crank and said oscillated lever, a series of ratchet disks mounted on a vertical shaft and adapted to be selectively rotated by said bell-crank and pawl, a vertical shaft and a series of gears connecting the ratchet disks with the saw-holding members and adapted to cause the same to move past the file-holding member when said ratchet disks are rotated, and means to predetermine the amount of movement of said saw-holding members, said means comprising separating disks placed between said ratchet disks and having shoulders thereon to be interposed between said pawl and the notches of said ratchet disks.

3. A machine for the filing and setting of saws, comprising parallel members adapted to hold a saw positioned therebetween, a reciprocable file-holding member disposed thereabove, comprising a reciprocable slide, a stationary guide for said slide, a back member, a file-holder support, and clamping heads adapted to having a file positioned therein; a means adapted to reciprocate said file-holding member, comprising a link disposed between said reciprocable file-holding member and a pivotally mounted oscillated arm, an eccentric disk, an eccentric strap placed about said eccentric disk, and an arm disposed between said eccentric disk and said oscillating arm; and automatic means for spacing the saw-holding members past the file on the completion of filing a tooth.

4. A machine for the filing and setting of saws, comprising parallel members adapted to hold a saw positioned therebetween, a reciprocable file-holding member disposed thereabove, a means adapted to reciprocate said file-holding member comprising a link disposed between said reciprocable file-holding member and a pivotally mounted oscillating arm, an eccentric disk, an eccentric strap placed about said eccentric disk, and an arm disposed between said eccentric disk and said oscillating arm; and automatic means for spacing the saw-holding members past the file holding member.

5. A machine for the filing and setting of saws, comprising parallel members adapted to hold a saw positioned therebetween, a reciprocable file-holding member disposed thereabove, comprising a reciprocable slide, a stationary guide for said slide, a back member, a file-holder support, clamping heads adapted to having a file positioned therein; a means adapted to reciprocate said file-holding member comprising a link disposed between said reciprocable file holding member and a pivotally mounted oscillatable arm, an eccentric disk, an eccentric strap placed about said eccentric disk, and an arm disposed between said eccentric disk and said oscillating arm; a means to raise the file clear of the saw at the completion of the filing stroke preparatory to the return stroke, said means comprising an arm pivoted centrally to a stationary support, and having one end thereof pivotally connected to the before-mentioned stationary guide, an eccentric rod having one end thereof connected to an eccentric strap disposed about an eccentric disk and having a slot formed in its opposite end to slidably and pivotally connect said eccentric rod to said arm; and automatic means for spacing the saw positioned in the saw-holding members past the file on the completion of the filing of a tooth.

6. In a machine for the filing and setting of saws, comprising parallel members adapted to hold a saw therebetween, a reciprocable file-holding member disposed above said parallel members and adapted to having a reciprocating movement imparted thereto, means to position a file therein; a means to elevate said file at one state of the reciprocating movement thereof, said means comprising an arm pivoted centrally to a stationary support, and having one end thereof pivotally connected to the before-mentioned file-holding member, an eccentric rod having one end thereof connected to an eccentric strap disposed about an eccentric disk and having a slot formed in its opposite end to slidably and pivotally connect said eccentric rod to said arm; and automatic means for spacing the saw positioned in the saw-holding members past the file on the completion of the filing of a tooth.

7. In a machine for the filing and setting of saws, consisting of parallel members adapted to hold a saw positioned, a column support for said parallel members, a table base support for said column, said column adapted to partial revolution about the vertical center axis of said table base support; a reciprocable file-holding member disposed above said first-mentioned parallel members; a means adapted to reciprocate said file-holding member consisting of a link disposed between said reciprocable file-holding member and a pivotally mounted oscillating arm, an eccentric disk, an eccentric strap placed about said eccentric disk, and an arm disposed between said eccentric disk and said oscillating arm; and automatic means for spacing the saw-holding members past the file holding member.

RICHARD THOMAS MYERS.